US008381579B2

(12) United States Patent
Sato et al.

(10) Patent No.: US 8,381,579 B2
(45) Date of Patent: Feb. 26, 2013

(54) VIBRATION DAMPING DEVICE AND VEHICLE

(75) Inventors: Yushi Sato, Mie (JP); Hideaki Moriya, Mie (JP); Takeo Ito, Mie (JP); Takayoshi Fujii, Mie (JP); Takashi Fukunaga, Mie (JP); Katsuyoshi Nakano, Mie (JP); Hiroshi Nakagawa, Mie (JP); Hidetoshi Katada, Mie (JP); Takeshi Tomizaki, Mie (JP); Takashi Onoue, Mie (JP); Yasushi Muragishi, Mie (JP)

(73) Assignee: Sinfonia Technology Co., Ltd., Tokyo (JP)

( * ) Notice: Subject to any disclaimer, the term of this patent is extended or adjusted under 35 U.S.C. 154(b) by 299 days.

(21) Appl. No.: 12/991,260

(22) PCT Filed: May 13, 2009

(86) PCT No.: PCT/JP2009/058883
§ 371 (c)(1),
(2), (4) Date: Nov. 5, 2010

(87) PCT Pub. No.: WO2009/139403
PCT Pub. Date: Nov. 19, 2009

(65) Prior Publication Data
US 2011/0048118 A1 Mar. 3, 2011

(30) Foreign Application Priority Data

May 14, 2008 (JP) ................................. 2008-127630
May 14, 2008 (JP) ................................. 2008-127631

(51) Int. Cl.
*G01M 15/12* (2006.01)
(52) U.S. Cl. .................................................... 73/117.03
(58) Field of Classification Search ............... 73/114.07, 73/117.01, 117.03
See application file for complete search history.

(56) References Cited

U.S. PATENT DOCUMENTS

| 5,792,948 | A | 8/1998 | Aoki et al. | |
|---|---|---|---|---|
| 7,409,268 | B2* | 8/2008 | Ichikawa et al. | 700/280 |
| 2005/0126849 | A1 | 6/2005 | Pearson et al. | |
| 2012/0197490 | A1* | 8/2012 | Muragishi et al. | 701/37 |
| 2012/0197491 | A1* | 8/2012 | Muragishi et al. | 701/37 |

FOREIGN PATENT DOCUMENTS

| JP | 9-230943 A | 9/1997 |
|---|---|---|
| JP | 9-280307 A | 10/1997 |

(Continued)

OTHER PUBLICATIONS

International Search Report of PCT/JP2009/058883, mailing date Aug. 18, 2009.

*Primary Examiner* — Eric S McCall
(74) *Attorney, Agent, or Firm* — Westerman, Hattori, Daniels & Adrian, LLP (57) ABSTRACT

The present invention provides a vibration damping device which can enhance a vibration damping effect even in a case where a vibration damping target position and a vibration damping force generation position are different from each other. The vibration damping device includes a vibration detecting unit for detecting a vibration which is caused by a vibration generating source and is transmitted to a position at which the vibration is to be damped; a vibration application unit which generates a vibration damping force to cancel the vibration, and is provided at a position different from the position at which the vibration is to be damped; a vibration application command generating unit for outputting a vibration application command to generate the vibration damping force in the vibration application unit, based on the vibration detected by the vibration detecting unit; and a vibration application command correcting unit which imparts to the vibration application command, a reverse property of a vibration damping force transmission path including a vibration transmission property from a position at which the vibration application unit is mounted to the position at which the vibration is to be damped, and then outputs the vibration application command to the vibration application unit.

12 Claims, 5 Drawing Sheets

FOREIGN PATENT DOCUMENTS

| | | |
|---|---|---|
| JP | 10-049204 A | 2/1998 |
| JP | 2000-250637 A | 9/2000 |
| JP | 2003-195951 A | 7/2003 |
| JP | 2004-343964 A | 12/2004 |
| JP | 2005-516299 A | 6/2005 |

* cited by examiner

VIBRATION DAMPING DEVICE AND VEHICLE

TECHNICAL FIELD

The present invention relates to a vibration damping device for damping vibrations to be generated and a vehicle including the vibration damping device.

BACKGROUND ART

With respect to vibrations of a vehicle generated by the output torque variation of the vehicle engine, a vibration damping device has been known which actively apply vibrations by causing a vibration application means to generate a vibration damping force in order to damp vibrations of a vehicle. Specifically, as such a vibration damping device, a damping device has been proposed which comprises a linear actuator serving as a vibration application means provided in an engine as a vibration generating source, a means for detecting the number of revolutions of the engine as the vibration generating source, a vibration detecting means for detecting vibrations at the position at which the vibrations are to be damped, i.e., a vibration-damped position, and an adaptive control algorithm for outputting a vibration application force to the linear actuator based on the detected number of revolutions of the engine and the vibrations at the vibration-damped position (see for example, Patent Document 1). In this vibration damping device, a vibration application command having the optimum amplitude and phase can be output by the adaptive control algorithm, in accordance with the number of revolutions of the engine and the vibrations currently detected at a vibration-damped position. As a result, vibrations which are generated from the engine serving as the vibration generating source and are transmitted to positions such as a seat section, in which the vibrations are to be damped, can be reduced by a vibration damping force generated from the vibration application means.

On the other hand, as a linear actuator serving as a vibration application means, a linear actuator has been known in which an elastic supporting portion (a plate spring) holds a movable element at a predetermined position and elastically deforms to support the movable element (see for example, Patent Document 2). Since this linear actuator does not generate wear and slide resistance in the movable element, even after the use for long time, high reliability is obtained without decreasing the accuracy of an axis supporting and the improvement of performance can be obtained without the loss of electric power consumption due to the slide resistance. Further, when the elastic supporting portion is supported by a stator at a position farther than a coil while avoiding the interference with the coil and using the movable element as a base point, it becomes possible to arrange a large coil and the elastic supporting portion closer to each other, whereby miniaturization of the linear actuator can be achieved.

When a vibration damping control is performed to damp vibrations of a target equipment by providing the linear actuator described in the Patent Document 2 with an auxiliary mass (a weight) and using a reaction force generated upon vibrating this auxiliary mass, an amplitude command value and a frequency command value are obtained based on a vibration state of the control target equipment, and a current value, which is applied to the linear actuator, is controlled in accordance with these amplitude command value and frequency command value. Since an attachment of such a vibration damping device to the body of an automobile permits compensation of force, which is applied from the engine to the body of automobile, the vibration of the body can be reduced.

PRIOR ART DOCUMENT

Patent Document(s)

[Patent Document 1] Japanese Patent Application Laid-open No. Hei. 10-049204
[Patent Document 2] Japanese Patent Application Laid-open No. 2004-343964

SUMMARY OF THE INVENTION

Problem(s) to Be Solved by the Invention

In the vibration damping device disclosed in Patent Document 1, a linear actuator serving as a vibration application means is mounted near the engine serving as a vibration generation source of the vehicle body. However, when retrofitting a linear actuator described in Patent Document 2 as a vibration application means into the vehicle body, the linear actuator cannot be sometimes mounted near the engine or near the vibration-damped position for the reasons of the installation space. In such a case, although the mounting position of the vibration application means must be spaced from the engine and a vibration-damped position, since the vibration generation source (engine), the vibration application means (linear actuator), and the vibration-damped position (seat section) are different from each other, there is a problem that the optimum vibration damping force cannot be obtained. That is, the vibration damping force generated by the vibration application means cannot effectively exert an effect on a vibration-damped position, due to an influence of the transmission property from the mounting position of the vibration application means to the vibration-damped position. Further, since this transmission property can be determined by the rigidity of the vehicle body, the responsivity to the command of the vibration application means, the filter properties of the acceleration sensor, and the like, there is a problem that the amplitude and phase of the vibration damping force to be generated by the vibration application means must be determined in consideration of these transmission properties.

The present invention was made in consideration of such situations and the object of the present invention is to provide a vibration damping device and a vehicle, which can enhance the vibration damping effects even in a case where the vibration target position and the generation position of the vibration damping force are different from each other.

Means for Solving the Problem(s)

A vibration damping device according to the first invention includes: a vibration detecting means for detecting a vibration which is caused by a vibration generating source and is transmitted to a position at which the vibration is to be damped; a vibration application means which generates a vibration damping force to cancel the vibration, and is provided at a position different from the position at which the vibration is to be damped; a vibration application command generating means for outputting a vibration application command to generate the vibration damping force in the vibration application means, based on the vibration detected by the vibration detecting means; and a vibration application command correcting means which imparts to the vibration application command, a reverse property of a vibration damping force transmission path including a vibration transmission property from a position at which the vibration application means is mounted to the position at which the vibration is to be damped, and then outputs the vibration application command to the vibration application means.

According to this configuration, the vibration damping device includes the vibration application command generating means to generate the vibration damping force for canceling vibrations detected by the vibration detecting means, and imparts the previously-obtained reverse property of the vibration damping force transmission path including the vibration transmission property from the position mounted with a vibration application means to the vibration-damped position, to the vibration application command output by the vibration application command generating means. The vibration application correcting means outputs the vibration application command imparted with the reverse property of the vibration damping force transmission path. In this manner, even if the vibration damping target position and the vibration damping force generating position are different from each other, a vibration damping force obtained in consideration of a property of a vibration damping force transmission path including a vibration transmission property from a position mounted with a vibration application means to a vibration-damped position. Consequently, such an effect is obtained that vibrations detected by the vibration detecting means mounted at a vibration-damped position can be appropriately damped without receiving an influence of transmission properties from the position mounted with the vibration application means to the vibration detecting means.

A vibration damping device according to the second invention includes a vibration detecting means for detecting a vibration which is caused by a vibration generating source and is transmitted to a position at which the vibration is to be damped; a vibration application means which generates a vibration damping force to cancel the vibration, and is provided at a position different from the position at which the vibration is to be damped; and a vibration application command generating means for outputting a vibration application command to generate the vibration damping force in the vibration application means, based on the vibration detected by the vibration detecting means. The vibration application command generating means generates a vibration application command for generating the vibration damping force, based on a correction reference sine wave or a correction reference cosine wave obtained by imparting a reverse property of a vibration damping force transmission path including a vibration transmission property from a position at which the vibration application means is mounted to the position at which the vibration is to be damped, to a reference sine wave or a reference cosine wave which is equal to a frequency at the position at which the vibration is to be damped. The vibration application command generating means outputs the generated vibration application command to the vibration application means.

Since operations for imparting the reverse property of the vibration damping force transmission path are performed prior to the output of the vibration application command generating means with respect to the reference sine wave and the reference cosine wave, an operation circuit, which performs an operation for imparting the reverse property to the vibration damping force, can be simplified and speeded up, in addition to the effects obtained by the above-mentioned first invention. That is, a correction reference sine wave or a correction reference cosine wave is obtained by previously performing the operation for imparting the reverse property of the vibration damping force transmission path at a time of generation of the reference sine wave and the reference cosine wave. The vibration damping command for generating the vibration damping force is output to the vibration application means based on this correction reference sine wave or correction reference cosine wave. Accordingly, the operation for imparting the reverse property of the vibration damping force transmission path no longer requires processing such as analyzing vibration signals during a predetermined time and the operation can be performed by referring to a table only. Therefore, the operation circuit can be simplified while the operation time can be shortened.

Here, the reverse property of the vibration damping force transmission path including the vibration transmission property from the position mounted with the vibration application means to a vibration-damped position, indicates a transmission property of the vibration damping force transmission path from the vibration application command output by the vibration application command generating means through the vibration application means to the vibration detecting means including the vibration transmission property of the position vehicle body frame. That is, the reverse property of the vibration damping force transmission path including the vibration transmission property from the position provided with the vibration application means to the vibration-damped position indicates not only the reverse property of the vibration transmission path from the vibration application means to the vibration detecting means (the reverse property for the vibration transmission property of the vehicle body frame) but also a reverse property of a series of paths in which: the vibration application command is output from the vibration application command generating means and reaches the vibration application means; the vibration damping force is generated by the vibration application means; and the generated vibration damping force reaches the vibration detecting means.

The vibration damping device of the second invention further comprises a frequency detecting means for detecting a frequency of vibrations caused by the vibration generating source. In a case where a reference sine wave or a reference cosine wave equal to the frequency of vibrations to be damped is generated based on the frequency detected by the frequency detecting means, the frequency detecting means detects a frequency of vibrations caused by the vibration generating source so that a reference sine wave or a reference cosine wave equal to the frequency of vibrations to be damped is generated based on the detected vibration frequency. Thus, a reference sine wave or a reference cosine wave for generating a vibration application command for generating a vibration damping force can be easily generated. Accordingly, such effects can be obtained that the vibration damping device can be configured by a simple wave shape generator while vibrations detected by the vibration detecting means provided at a vibration-damped position can be appropriately damped without receiving an influence of transmission properties from a position mounted with the vibration application means to the vibration detecting means.

In the vibration damping device according to the first invention or the second invention, when the vibration application means is mounted on a body frame of a vehicle, the vibration application means can be mounted at an arbitrary position of the vehicle body frame. Thus, a degree of freedom for positioning of a place to be mounted with the vibration damping device can be improved and at the same time, the vibration damping device can be retrofitted on the vehicle.

When the vibration damping device according to the first invention or the second invention is provided in a vehicle, vibrations can be damped by the vibration damping device, thereby being able to improve riding comfort of vehicle's passenger.

ADVANTAGEOUS EFFECT(S) OF THE INVENTION

According to the first invention, such an effect can be obtained that vibrations detected by the vibration detecting means provided at a vibration-damped position can be appropriately damped without receiving an influence of transmission properties from a position mounted with the vibration application means to the vibration detecting means.

According to the second invention, since an operation for imparting a reverse property is performed by referring to a table only, the operation can be simplified and speeded up. Further, since the operation can be simplified, an increase in cost of an operation processor can be prevented.

MODE FOR CARRYING OUT THE INVENTION

First Embodiment

Figure 1:
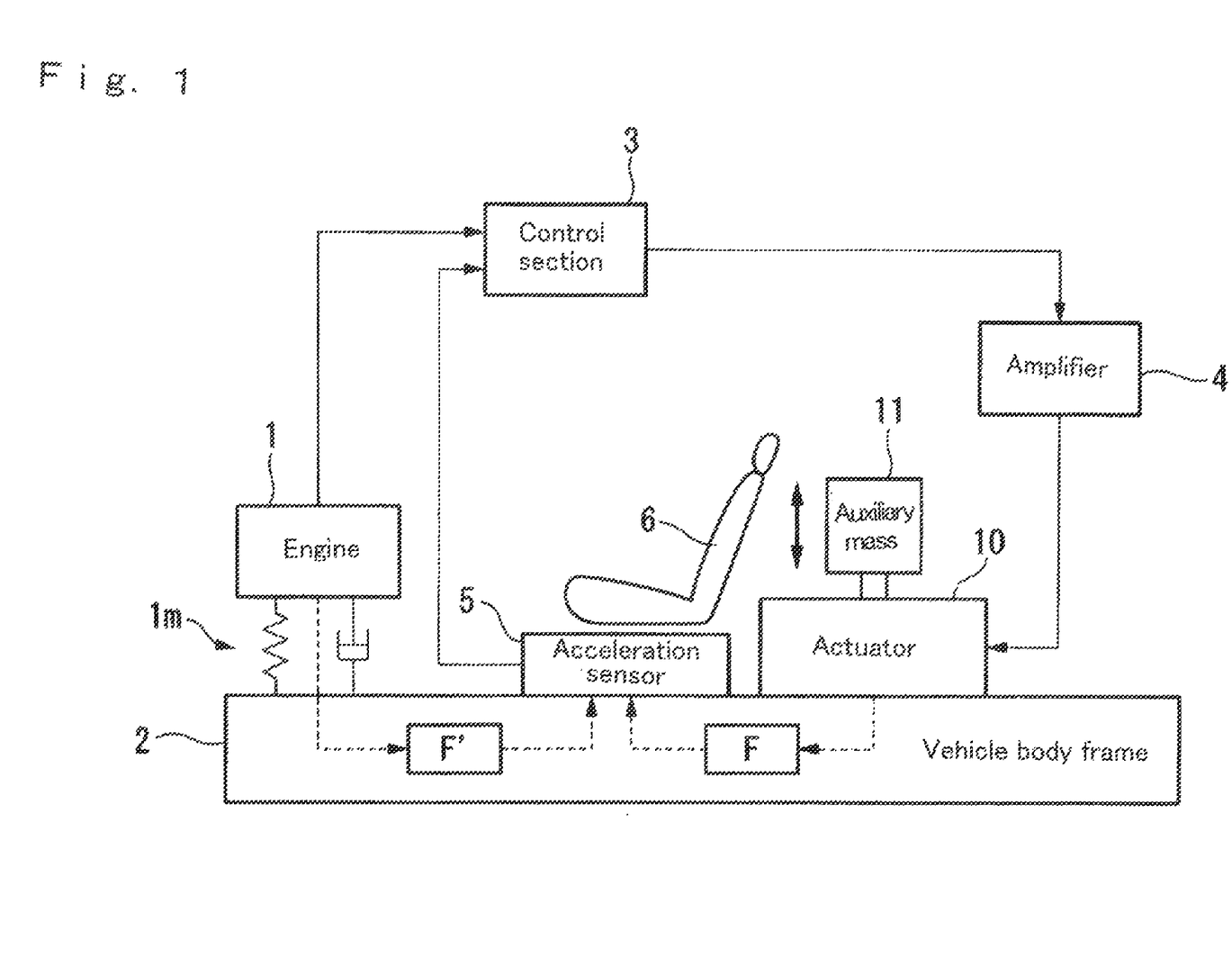
FIG. 1 is a block diagram showing a configuration of a vibration damping device according to a first embodiment (first invention).

A vibration damping device according to a first embodiment (first invention) will be described with reference to drawings below. FIG. 1 is a block diagram showing a configuration of the first embodiment. In FIG. 1, the reference numeral 1 denotes an engine (vibration generating source) installed on a vehicle to generate a driving force for traveling a vehicle such as a car and the engine 1 is a generating source of vibrations which are generated in the vehicle. The reference numeral 10 denotes a linear actuator (hereinafter referred to as "actuator" (vibration application means)), which includes an auxiliary mass 11 and generates a vibration damping force for damping vibrations generated in a vehicle, by a reaction obtained by vibrating the auxiliary mass 11. The reference numeral 2 denotes a body frame of a vehicle, in which the engine 1 is installed by an engine mount 1m and the actuator 10 is mounted at a predetermined position.

Here, the actuator 10 damps and controls vertical vibrations (in a direction of gravitational force), which are generated in the vehicle body frame 2. The reference numeral 3 denotes a control section, which generates a vibration damping force in the actuator 10 to control the damping of vibrations generated in a vehicle. The reference numeral 4 denotes an amplifier, which supplies the actuator 10 with current for driving the actuator 10 based on command values output from the control section 3. The reference numeral 5 denotes an acceleration sensor (vibration detecting means) mounted on the vicinity of a seat 6 for a passenger in the vehicle (near the position at which vibrations are to be reduced). The control section 3 obtains a vibration application command for driving the actuator 10 based on an engine pulse signal (ignition timing signal), which is output from the engine 1, and an acceleration sensor output signal, which is output from the acceleration sensor 5, to output the command to the amplifier 4. The amplifier 4 obtains a current value to be supplied to the actuator 10 based on this vibration application command (force command value) and supplies the actuator 10 with the current value so that the auxiliary mass reciprocates (vertically moves in the example shown in FIG. 1).

Figure 2:
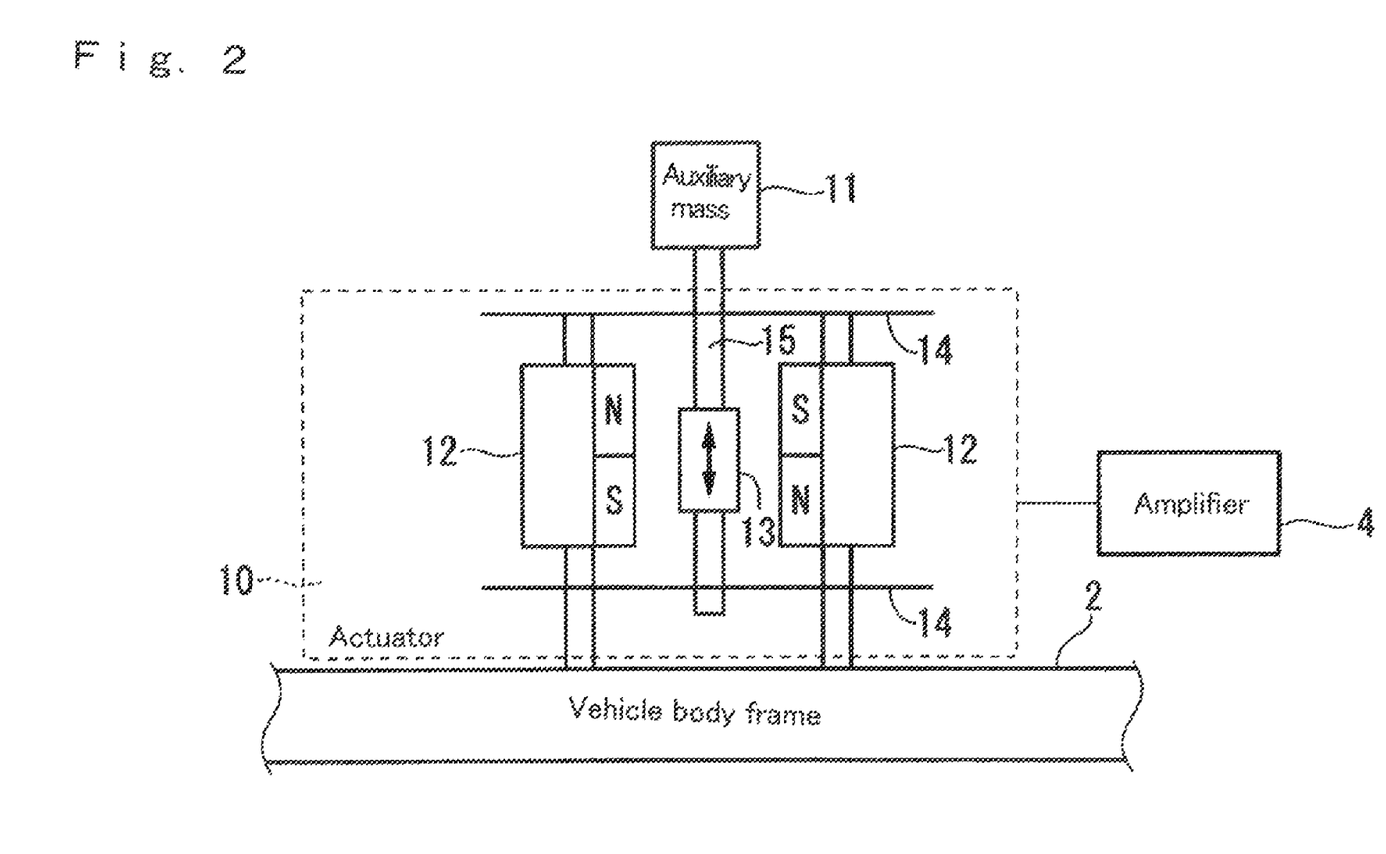
FIG. 2 is a schematic diagram showing a configuration of an actuator 10 in FIG. 1.

Here referring to FIG. 2, a detailed configuration of the actuator 10 shown in FIG. 1 will be described. FIG. 2 denotes a diagram showing a configuration of the actuator 10 in FIG. 1. In FIG. 2, the numeral reference 12 denotes a stator including a permanent magnet and is fixed to the vehicle body frame 2. The reference numeral 13 denotes a movable element, which reciprocates in the same direction as the vibration direction to be damped (vertical movement in the sheet of FIG. 2). Here the movable element 13 is fixed to the vehicle body frame 2 so that a direction of the vibration of the vehicle body frame 2 to be damped agrees with a reciprocating direction (direction of thrust force) of the movable element 13. The reference numeral 14 denotes a plate spring, which supports the movable element 13 and the auxiliary mass 11 so as to be movable in the direction of thrust force, and the plate spring 14 is fixed to the stator 12. The reference numeral 15 denotes a shaft which connects the movable element 13 with the auxiliary mass 11, and the shaft 15 is supported by the plate spring 14. The actuator 10 and the auxiliary mass 11 form a vibration absorber.

Next, an operation of the actuator 10 shown in FIG. 2 will be described. When an alternating current (sine wave current, rectangular wave current) is caused to flow in a coil (not shown) forming the actuator 10, the magnet flux is led from the S pole to the N pole in the permanent magnet in a state where current in a predetermined direction flows in the coil, so that a magnet flux loop is formed. As a result, the movable element 13 is moved in a direction opposite to the gravitational force (an upward direction). On the other hand, when current in a direction opposite to the predetermined direction is caused to flow in the coil, the movable element 13 is moved in the direction of gravitational force (a downward direction). The movable element 13 repeats the above-mentioned operations by alternately changing the direction of flow of the alternating current in the coil so that the movable element 13 reciprocates in the axial direction of the shaft 15 with respect to the stator 12. Consequently, the auxiliary mass 11 connected to the shaft 15 is vibrated in the vertical direction. The vibration absorber formed of the actuator 10 and the auxiliary mass 11 controls the acceleration of the auxiliary mass 11 to adjust the vibration damping force based on a current control signal output from the amplifier 4, so that vibrations generated in the vehicle body frame 2 are compensated whereby the vibrations can be reduced.

Figure 4:
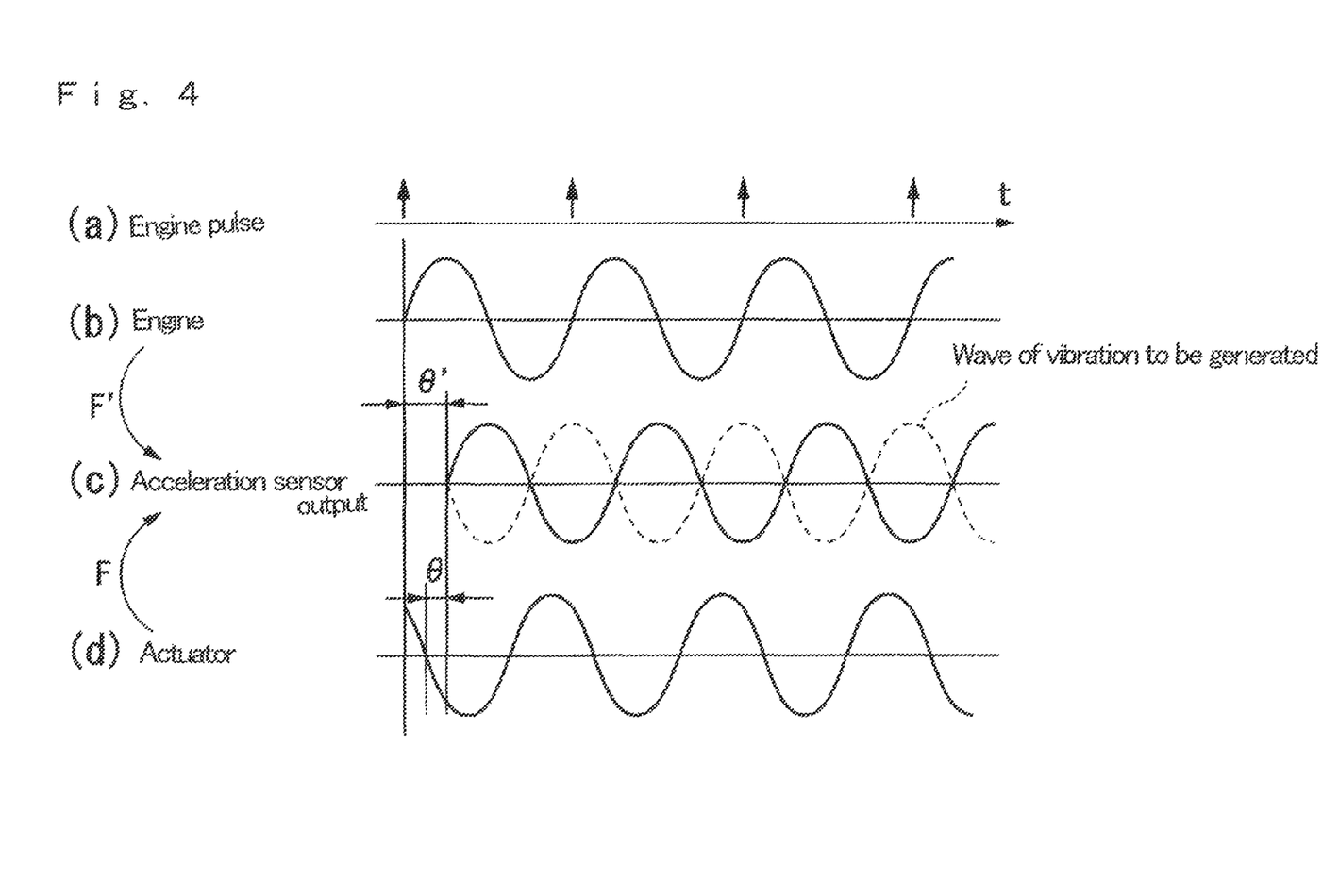
FIG. 4 is an explanatory view showing vibration transmission properties F, F' of a vehicle body frame 2 in FIG. 1.

Next, referring to FIG. 4, a vibration transmission property of the vehicle body frame 2 shown in FIG. 1 will be explained. Here, the explanation will be made while defining that a vibration source of the vehicle body frame 2 is only the engine 1 and the vibration generated in the vicinity of the seat 6 for a passenger (driver seat) is to be damped or suppressed among vibrations generated in the vehicle body frame 2. An engine pulse for driving the engine 1 is a pulse, which occurs at the ignition timing and is output by a pulse signal of 40 Hz if the number of revolutions of four-cylinder engine 1 is 1200 rpm (see FIG. 4(a)). Since each cylinder of the engine 1 ignites in accordance with this engine pulse, vibrations in synchronization with this ignition timing are generated from the engine 1 (see FIG. 4(b)). The vibrations generated in the engine 1 are transmitted through the vehicle body frame 2 to reach the seat 6. At this time, the vibration transmission property of the vehicle body frame 2 is defined as F'. The vibrations generated in the engine 1 change a phase (for example, delays by only θ') by the vibration transmission property F' of the vehicle body frame 2 and at the same time change an amplitude so that the vibrations are exhibited as the vibrations of the seat 6. The vibrations are detected by the acceleration sensor 5 so that vibrations generated at the seat 6 can be detected (see FIG. 4(c)). If vibrations (vibrations shown by a broken line of FIG. 4) of a reverse phase of vibration signals obtained by the acceleration sensor 5 are generated at the position of the seat 6, vibrations generated at the seat 6 can be compensated. Thus, the vibrations of the seat 6 can be damped or suppressed.

However, a vibration source for generating a vibration damping force for damping vibrations cannot be sometimes provided in the vicinity of the seat 6 due to a limited layout of a vehicle. Therefore, the actuator 10 shown in FIG. 1 must be sometimes provided at a position different from the vibration-damped position (position mounted with the acceleration sensor 5). Thus, the vibration damping force, which is generated by vibrating the auxiliary mass 11, is transmitted through the vehicle body frame 2 to reach the seat 6. At this time, the phase and amplitude of vibrations generated in the actuator 10 are changed due to the transmission property F of the vehicle body frame 2. Therefore, for the vibrations to be generated by the actuator 10, signals of a reverse phase to the output signals of the acceleration sensor 5 must be formed in consideration of the phase change and amplitude change (for example, the phase is advanced by θ or the amplitude is enlarged) based on the vibration transmission property G from a mounting position of the actuator 10 to a mounting position of the acceleration sensor 5 (position of the seat 6) (see FIG. 4(d)). The transmission property G indicates a transmission property ranging from a vibration application command to the amplifier 4 through the actuator 10 and the amplifier 4 to an acceleration sensor output including the vibration transmission property F of the vehicle body frame.

Accordingly, the object of the present invention is to generate a vibration damping force in consideration of the phase change and the amplitude change based on the vibration transmission property G from a mounting position of the actuator 10 to a mounting position of the acceleration sensor 5 (position of the seat 6).

Figure 3:
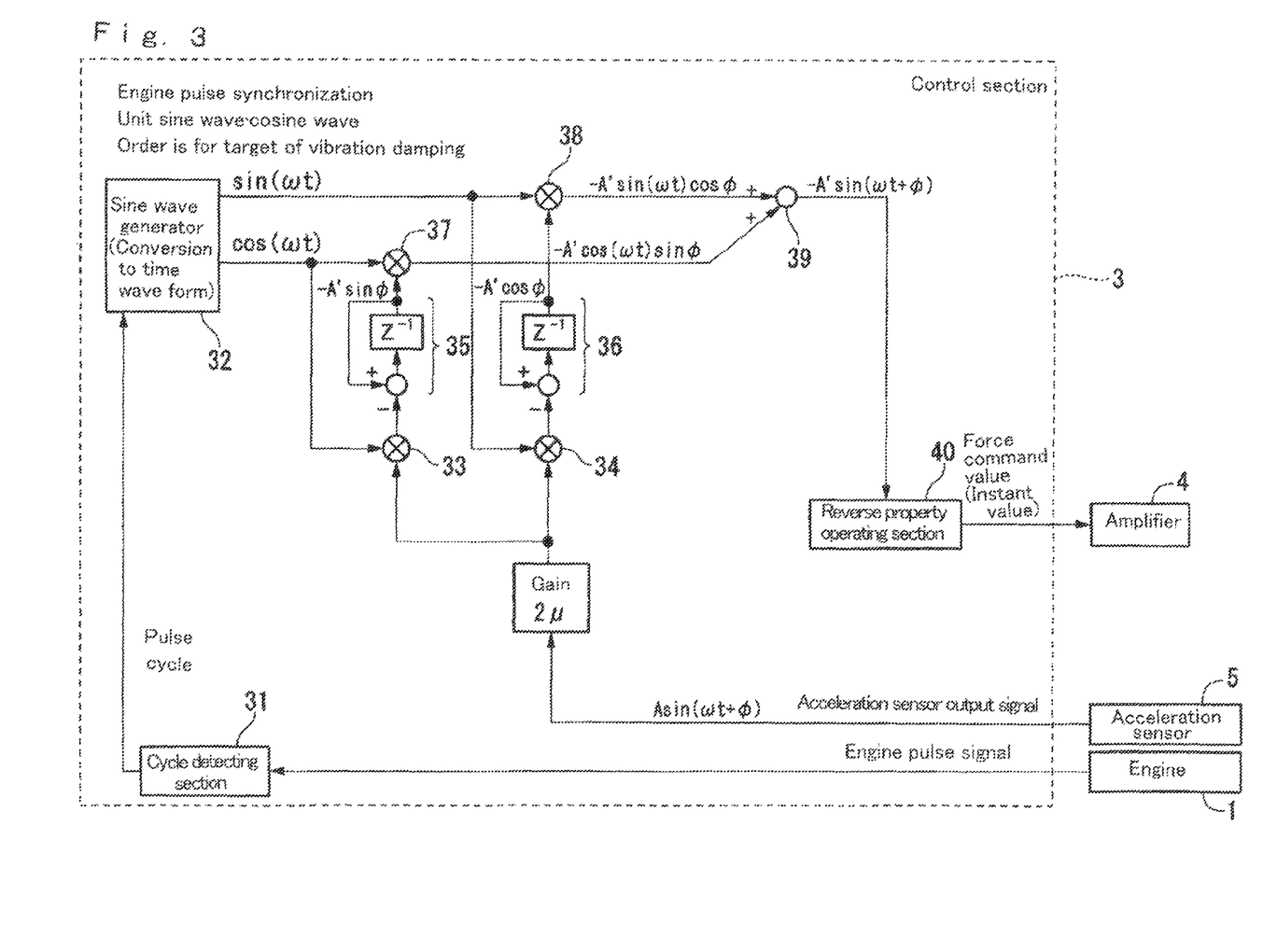
FIG. 3 is a block diagram showing a configuration of a control section 3 in FIG. 1.

Next, referring to FIG. 3, explained is an operation that the control section 3 shown in FIG. 3 forms a vibration application command for generating a vibration damping force in consideration of a phase change and an amplitude change based on the vibration transmission property G from a mounting position of the actuator 10 to a mounting position of the acceleration sensor 5. FIG. 3 is a control block diagram showing a detailed configuration of the control section 3 shown in FIG. 1. The control section 3 inputs output signals of the acceleration sensor 5 and engine pulse signals of the engine 1, and outputs a vibration application command (a force command value) to the amplifier 4. It is noted that the control system explained here is based on an adaptive control algorithm utilizing the least squares method by which an amount of state (vibration in this example) of a reference point (a vibration detecting position in this example) can be damped or suppressed with respect to a component of a fundamental frequency of a cycle signal and its harmonic component.

First, an acceleration sensor output signal (A sin (ωt+φ)) output from the acceleration sensor 5 is multiplied by a convergence gain 2μ. On the other hand, a cycle detecting section 31 inputs engine pulse signals, detects a cycle of the engine pulse signals, and outputs it to a sine wave generator 32. The sine wave generator 32 inputs a pulse cycle and outputs a reference sine wave sin (ωt) and a reference cosine wave cos (ωt). The acceleration sensor output signal multiplied by the convergence gain 2μ is multiplied by the reference sine wave sin (ωt) and the reference cosine wave cos (ωt) output from the sine wave generator 32, by multipliers 33 and 34, respectively. In a case where the obtained results are respectively integrated by integrators 35 and 36, values of −A' sin φ and −A' cos φ are respectively output from the integrators 35 and 36.

In a case where a value of −A' sin φ output from the integrator 35 and the reference cosine wave cos (ωt) are multiplied by means of a multiplier 37, the value of −A' cos (ωt)·sin φ is output from an integrator 37. On the other hand, in a case where the value of −A' cos φ output from the integrator 36 and the reference sine wave sin (ωt) are multiplied by means of a multiplier 38, the value of −A' sin (ωt)·cos φ is output.

Subsequently, in a case where the value of −A' cos (ωt)·sin φ output from the multiplier 37 and the value of −A' sin (ωt)·cos φ output from the multiplier 38 are added by means of an adder 39, the value of −A' sin (ωt+φ) is output from the adder 39 according to the addition theorem of trigonometric functions. When this value of −A' sin (ωt+φ) is multiplied by 1/G which is a reverse property of a vibration damping force transmission path from a vibration application command value to an output of the acceleration sensor 5, a vibration application command for generating a vibration damping force can be formed. A reverse property operational section 40 (vibration application command correction means) provides the value of −A' sin (ωt+φ) output from the adder 39 with the reverse property 1/G of a vibration damping force transmission path from a vibration application command value to an output of the acceleration sensor 5 so that a vibration application command for generating a vibration damping force is formed and output to the amplifier 4. The reverse property operational section 40 shown in FIG. 3 previously measures a mass of an auxiliary mass mounted on the actuator 10, a driving performance of the actuator 10, a vibration transmission property F of the vehicle body frame 2, and the like so as to set the reverse property (1/G) of the transmission property G obtained by these measured values.

When this vibration application command is output to the amplifier 4, the auxiliary mass 11 is vibrated to generate a vibration damping force. As a result, vibrations generated by the engine 1 and transmitted to the seat can be damped or suppressed. At this time, since the vibration damping force generated by vibrating the auxiliary mass by means of the actuator 10 is a vibration damping force in consideration of the phase change and the amplitude change based on the transmission property G including the vibration transmission property F from a position mounted with the actuator 10 to a position mounted with the acceleration sensor 5, even if a position at which vibrations are detected (position of the seat 6) and a position at which a vibration damping force is generated are different from each other, vibrations to be generated can be effectively damped.

As described above, a vibration application command for generating a vibration damping force obtained by imparting thereto the reverse property 1/G of a vibration damping force transmission path including the vibration transmission property F from the position mounted with the actuator 10 the vibration-damped position (seat 6) is output to the actuator 10. As a result, such an effect can be obtained that the vibration damping can be appropriately performed without receiving the influence of the transmission property from the vibration application means mounting position to the vibration detecting means. Further, since the actuator 10 can be mounted onto an arbitrary position of the vehicle body frame 2, a degree of freedom for positioning of a place to be mounted with the vibration damping device can be improved. Further, since the actuator 10 can be mounted on the arbitrary position of the vehicle body frame 2, a vibration damping device can be retrofitted on a vehicle. Further, since vibrations generated in the vehicle can be damped by means of the vibration damping device, riding comfort of vehicle's passengers can be improved.

It is noted that although in the above descriptions, a vibration damping force was generated by using the linear actuator 10 shown in FIG. 2, any means may be adopted to vibrate the auxiliary mass 11 as long as such a means is a driving source capable of generating a reaction force by which vibrations can be damped or suppressed by vibrating the auxiliary mass 11.

Second Embodiment

A vibration damping device of a second embodiment according to the second invention will be described while omitting descriptions and drawings by denoting the same reference numerals to the same portions as in the above-described first embodiment. FIGS. 1, 2 and 4 are the same as in the first embodiment, and explanation will be made with reference to FIG. 5 instead of FIG. 3. In the vibration damping device according to the second embodiment, the control section 3 according to the first embodiment is replaced by a control section 103, which will be described below.

Figure 5:
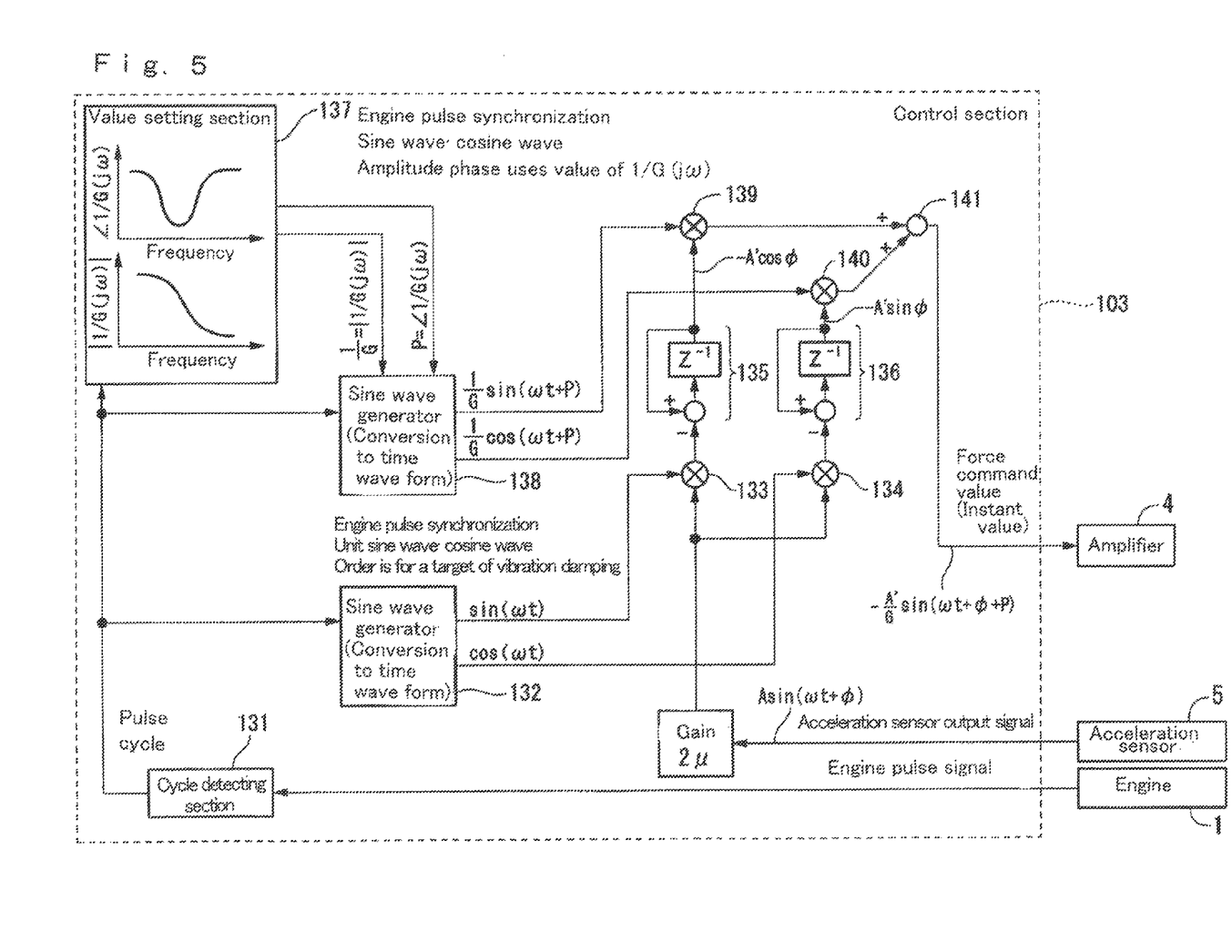
FIG. 5 is a block diagram showing a configuration of a control section 103 according to a second embodiment (second invention).

FIG. 5 is a control block diagram showing a detailed configuration of the control section 103. The control section 103 inputs and outputs signals of the acceleration sensor 5 and engine pulse signals of the engine 1, and outputs a vibration application command to the amplifier 4. It is noted that a control system explained here is based on an adaptive control algorithm utilizing the least squares method in which an amount of state (vibration in this example) of a reference point (a vibration detecting position in this example) can be damped or suppressed with reference to a component of a fundamental frequency of a cycle signal and its harmonic component.

First, a sine wave generator 132 receives input of a detection result (pulse cycle) of a cycle of the engine pulse signal output from the engine 1 detected by means of a cycle detecting section 131 and based on the input, the sine wave generator 132 outputs a reference sine wave sin ($\omega$t) and a reference cosine wave cos ($\omega$t). On the other hand, the acceleration sensor output signal output from the acceleration sensor 5 is multiplied by the convergence gain 2$\mu$. The obtained results are respectively multiplied by the reference sine wave sin ($\omega$t) and the reference cosine wave cos ($\omega$t) output from the sine wave generator 132, by multipliers 133 and 134. When the obtained results are integrated by integrators 135 and 136, respectively, a value of $-A'$ cos $\phi'$ as a phase difference component is output from the integrator 135 and a value of $-A'$ sin $\phi'$ as a phase difference component is output from the integrator 136.

A value setting section 137 includes two tables which previously store a phase component $\angle 1/G$ (j$\omega$) of the transmission property G of the vibration damping transmission path and an amplitude component |1/G (j$\omega$)| of the transmission property G while correlating these components with each frequency. The value setting section 137 receives input of a cycle of the engine pulse signal detected by the cycle detecting section 131, and reads out from these two table, the phase component $\angle 1/G$ (j$\omega$) and the amplitude component |1/G (j$\omega$)| correlated to the frequency obtained from the cycle. The value setting section 137 then sets the phase component and the amplitude component to P and 1/G, respectively, thereby outputting them to a sine wave generator 138. The sine wave generator 138 receives input the detection result of the cycle of the engine pulse signal detected by the cycle detector 31, and the phase component P and the amplitude component 1/G of the vibration transmission property G. The sine wave generator 138 obtains a frequency based on the pulse cycle, and outputs correction reference sine wave (1/G) sin ($\omega$t+P) and correction reference cosine wave (1/G) cos ($\omega$t+P) which are obtained by multiplying the reference sine wave sin ($\omega$t) and the reference cosine wave cos ($\omega$t) formed so as to be equal to the aforementioned frequency by the reverse property ($\angle 1/G$ (j$\omega$) and |1/G (j$\omega$)|) of the vibration transmission property G, respectively, (a multiplication is performed with respect to the amplitude component 1/G while an addition is performed with respect to the phase component).

The phase difference component $-A'$ cos $\phi$ output from the integrator 135 and the correction reference sine wave (1/G) sin ($\omega$t+P) are multiplied to each other by an multiplier 139, and the phase difference component $-A'$ sin $\phi$ output from the integrator 136 and the correction reference cosine wave (1/G) cos ($\omega$t+P) are multiplied to each other by an multiplier 140. When the outputs from the multipliers 139 and 140 are added by an adder 141, a signal of $-(A'/G)$ sin ($\omega$t+$\phi$+P) is obtained according to the addition theorem of trigonometric functions. Specifically, the acceleration sensor output signal (A sin ($\omega$t+$\phi$) is multiplied by a value of ($-1$) for reversing the phase and the amplitude component (1/G) of the vibration transmission property G while obtaining a signal in which the phase difference component (P) is added to the phase component. The signal ($-(A'/G)$ sin ($\omega$t+$\phi$+P)) output from the adder 141 becomes a vibration application command for generating a vibration damping force, in consideration of the phase change and amplitude change based on the vibration transmission property G from the position mounted with the actuator 10 to the position mounted with the acceleration sensor 5.

When this vibration application command is output to the amplifier 4, the auxiliary mass 11 is vibrated to generate a vibration damping force so that the vibrations generated by the engine 1, which are detected by the acceleration sensor 5, are to be damped or suppressed. At this time, the vibration damping force generated by vibrating the auxiliary mass by means of the actuator 10 is a vibration damping force obtained in consideration of the phase change and amplitude change based on the transmission property G including the vibration transmission property F from the position mounted with the actuator 10 and the position mounted with the acceleration sensor 5, so that even if a position (seat 6) at which vibrations are detected and a position at which the vibration damping force is generated are different from each other, generated vibrations can be effectively damped or suppressed.

As described above, a vibration application command for generating a vibration damping force obtained by imparting thereto the reverse property 1/G of a vibration damping force transmission path including the vibration transmission property F from the position mounted with the actuator 10 to the vibration-damped position (seat 6) is output to the actuator 10. As a result, such an effect can be obtained that the vibration damping can be appropriately performed without receiving the influence of the transmission property from the vibration application means mounting position to the vibration detecting means. Further, since the actuator 10 can be mounted onto an arbitrary position of the vehicle body frame 2, a degree of freedom for positioning of a place to be mounted with the vibration damping device can be improved. Further, since the actuator 10 can be mounted on the arbitrary position of the vehicle body frame 2, a vibration damping device can be retrofitted on a vehicle. Further, since vibrations generated in the vehicle can be damped by means of the vibration damping device, riding comfort of vehicle's passengers can be improved.

Further, since the multiplication of the reverse property 1/G of a transmission property G of the entire control system can be previously performed with respect to the reference sine wave and the reference cosine wave, the operation circuit for multiplying the reverse property 1/G can be simplified while the operation speed can be enhanced. In a case where the vibration application command of the vibration damping force to be generated is multiplied by the reverse property 1/G of the vibration transmission property G, frequency and the like cannot be easily obtained based on the obtained instant value of the vibration damping force to be generated. Thus, it is necessary to obtain the frequency and the like by analyzing vibrations during a predetermined time and to multiply the vibration application command by the reverse property in accordance with the obtained frequency. On the other hand, with respect to an operation according to the present invention, the reverse property 1/G is previously multiplied at the time of generating the reference vibration signal, so that processing such as analyzing the vibration signal for a predetermined time is no longer required. Further, an operation of multiplying the reverse property can be performed by referring to the table only, thereby being able to simplifying the operation. Thus, the operation circuit can be simplified while the operation time can be shortened.

It is noted that the cycle detecting section 131 shown in FIG. 5 may be replaced with a frequency detecting section which detects a frequency of the engine pulse signal. In this manner, a configuration of the sine wave generators 132, 138 can be simplified since it is no longer necessary to obtain a frequency from the pulse cycle inside the sine wave generators 132, 138.

INDUSTRIAL APPLICABILITY

The vibration damping devices according to the first and second inventions can be adopted for use in vibration damping in a case where a position at which vibrations are to be damped and a position at which a damping force is to be generated are different from each other. Further, in the above-descriptions, it has been explained that a target to be vibration-damped is defined as a vehicle body frame. However, the equipment to be vibration-damped by the vibration damping device of the present invention is not necessarily the vehicle body frame, but a vehicle body of an autonomous traveling transfer vehicle or a robot arm, and the like may be adopted.

The invention claimed is:

1. A vibration damping device comprising:
   a vibration detecting means for detecting a vibration which is caused by a vibration generating source and is transmitted to a position at which the vibration is to be damped;
   a vibration application means which generates a vibration damping force to cancel the vibration, and is provided at a position different from the position at which the vibration is to be damped;
   a vibration application command generating means for outputting a vibration application command to generate the vibration damping force in the vibration application means, based on the vibration detected by the vibration detecting means; and
   a vibration application command correcting means which imparts to the vibration application command, a reverse property of a vibration damping force transmission path including a vibration transmission property from a position at which the vibration application means is mounted to the position at which the vibration is to be damped, and then outputs the vibration application command to the vibration application means.

2. A vehicle comprising the vibration damping device according to claim 1.

3. The vibration damping device according to claim 1 wherein the vibration application means is mounted on a body frame of a vehicle.

4. A vehicle comprising the vibration damping device according to claim 3.

5. A vibration damping device comprising:
   a vibration detecting means for detecting a vibration which is caused by a vibration generating source and is transmitted to a position at which the vibration is to be damped;
   a vibration application means which generates a vibration damping force to cancel the vibration, and is provided at a position different from the position at which the vibration is to be damped; and
   a vibration application command generating means for outputting a vibration application command to generate the vibration damping force in the vibration application means, based on the vibration detected by the vibration detecting means, wherein:
   the vibration application command generating means generates a vibration application command for generating the vibration damping force, based on a correction reference sine wave or a correction reference cosine wave obtained by imparting a reverse property of a vibration damping force transmission path including a vibration transmission property from a position at which the vibration application means is mounted to the position at which the vibration is to be damped, to a reference sine wave or a reference cosine wave which is equal to a frequency at the position at which the vibration is to be damped; and
   the vibration application command generating means outputs the generated vibration application command to the vibration application means.

6. A vehicle comprising the vibration damping device according to claim 5.

7. The vibration damping device according to claim 5 wherein the vibration application means is mounted on a body frame of a vehicle.

8. A vehicle comprising the vibration damping device according to claim 7.

9. The vibration damping device according to claim 5 further comprising a frequency detecting means for detecting a frequency of the vibration caused by the vibration generating source, wherein:
   the reference sine wave or reference cosine wave equal to the frequency of the vibration to be damped is generated based on the frequency detected by the frequency detecting means.

10. A vehicle comprising the vibration damping device according to claim 9.

11. The vibration damping device according to claim 9 wherein the vibration application means is mounted on a body frame of a vehicle.

12. A vehicle comprising the vibration damping device according to claim 11.

* * * * *